United States Patent
Hanner

(10) Patent No.: US 7,366,910 B2
(45) Date of Patent: Apr. 29, 2008

(54) SYSTEM AND METHOD FOR STRING FILTERING

(75) Inventor: Brian D. Hanner, Campbell, CA (US)

(73) Assignee: The Boeing Company, Seattle, WA (US)

( * ) Notice: Subject to any disclaimer, the term of this patent is extended or adjusted under 35 U.S.C. 154(b) by 687 days.

(21) Appl. No.: 10/196,509

(22) Filed: Jul. 15, 2002

(65) Prior Publication Data

US 2003/0033531 A1 Feb. 13, 2003

Related U.S. Application Data

(60) Provisional application No. 60/306,193, filed on Jul. 17, 2001, provisional application No. 60/306,188, filed on Jul. 17, 2001, provisional application No. 60/306,155, filed on Jul. 17, 2001.

(51) Int. Cl.
*G06F 21/00* (2006.01)
*G06F 7/00* (2006.01)
*H04L 9/00* (2006.01)
*H04K 1/00* (2006.01)

(52) U.S. Cl. .................. 713/179; 726/22; 708/203

(58) Field of Classification Search ................. 726/13, 726/22–24
See application file for complete search history.

(56) References Cited

U.S. PATENT DOCUMENTS

| | | | | |
|---|---|---|---|---|
| 5,353,024 A | * | 10/1994 | Graybill | ..................... 341/51 |
| 5,357,250 A | * | 10/1994 | Healey et al. | ............... 341/107 |
| 5,371,499 A | * | 12/1994 | Graybill et al. | ................ 341/51 |
| 5,586,280 A | * | 12/1996 | Simms | ......................... 711/4 |
| 5,587,725 A | * | 12/1996 | Sakanishi et al. | ........... 345/471 |
| 5,613,002 A | * | 3/1997 | Kephart et al. | ............... 726/24 |
| 5,675,711 A | * | 10/1997 | Kephart et al. | ............... 706/12 |
| 5,850,565 A | * | 12/1998 | Wightman | ..................... 710/1 |
| 5,907,834 A | * | 5/1999 | Kephart et al. | ............... 706/20 |
| 6,016,546 A | * | 1/2000 | Kephart et al. | ............... 726/24 |
| 6,240,213 B1 | * | 5/2001 | Cho | ........................... 382/245 |

(Continued)

FOREIGN PATENT DOCUMENTS

EP    0458041 A1 * 12/1991

OTHER PUBLICATIONS

Karp, Richard M. and Michael O. Rabin. Efficient randomized pattern-matching algorithms. IBM J. Red. Develop. vol. 31 No. 2, Mar. 1987.*

(Continued)

*Primary Examiner*—Christopher Revak
(74) *Attorney, Agent, or Firm*—Alston & Bird LLP

(57) ABSTRACT

A computer-based method for scanning data using string filtering includes compressing a data string using a hashing algorithm to obtain a data-string signature, and then determining that the data-string signature matches a known data-string signatures stored in a lookup table if the signature is determined to have a match in the lookup table.

32 Claims, 2 Drawing Sheets

U.S. PATENT DOCUMENTS

| | | | |
|---|---|---|---|
| 6,392,567 B2 * | 5/2002 | Satoh | 341/51 |
| 6,392,568 B1 * | 5/2002 | Cooper | 341/51 |
| 6,424,650 B1 * | 7/2002 | Yang et al. | 370/390 |
| 6,549,148 B2 * | 4/2003 | Satoh | 341/51 |
| 6,563,956 B1 * | 5/2003 | Satoh et al. | 382/245 |
| 6,597,812 B1 * | 7/2003 | Fallon et al. | 382/232 |
| 6,738,779 B1 * | 5/2004 | Shapira | 707/101 |
| 6,785,278 B1 * | 8/2004 | Calvignac et al. | 370/392 |
| 6,876,774 B2 * | 4/2005 | Satoh et al. | 382/245 |
| 6,880,087 B1 * | 4/2005 | Carter | 726/23 |
| 2003/0069941 A1 * | 4/2003 | Peiffer | 709/217 |

OTHER PUBLICATIONS

Manber, Udi. A Text Compression Scheme that Allows Fast Searching Directly in the Compressed File. ACM Transactions on Information Systems, vol. 15, No. 2, Apr. 1997. pp. 124-136.*

* cited by examiner

SYSTEM AND METHOD FOR STRING FILTERING

CROSS-REFERENCE TO RELATED APPLICATIONS

This application claims priority from commonly owned U.S. Provisional Patent Application Nos. 60/306,193, titled SYSTEM AND METHOD FOR STRING FILTERING, 60/306,188, titled SYSTEM AND METHOD FOR VIRTUAL PACKET REASSEMBLY and 60/306,155 titled SYSTEM AND METHOD FOR MULTIDIMENSIONAL DATA COMPRESSION, all of which were filed on Jul. 17, 2001, are presently pending, and are hereby incorporated by reference in their entirety.

CROSS-RELATED APPLICATIONS

This application is related to utility patent applications U.S. application Ser. No. 10/196,512 titled SYSTEM AND METHOD FOR VIRTUAL PACKET REASSEMBLY, which is now U.S. Pat. No. 7,171,440 and U.S. application Ser. No. 10/196,488 titled SYSTEM AND METHOD FOR MULTIDIMENSIONAL DATA COMPRESSION, which is now U.S. Pat. No. 7,191,468, which were filed on the same day as this application and which are hereby incorporated by reference in their entirety.

TECHNICAL FIELD OF THE INVENTION

The invention relates generally to filtering data to identify strings of interest. More particularly, the invention may comprise a system and method for compressing data to create a string signature, which may be used to determine whether the data includes one or more filter strings.

BACKGROUND OF THE INVENTION

The rapid growth and widespread use of the Internet has brought with it an increased threat of hacker attacks on systems and/or networks coupled to the Internet, such as, for example, Local Area Networks (LANs). Such attacks may compromise sensitive information and/or destroy data. As a result, a number of companies such as Axent (Rockville, Md.), Internet Security Systems (Atlanta, Ga.), and Network Flight Recorder (Rockville, Md.) have developed Intrusion Detection Systems (IDS).

An IDS attempts to detect hacker intrusions by monitoring network traffic. A key capability of the IDS involves filtering network packets for the purpose of identifying packets exhibiting characteristics of known hacker attacks. Filtering may require identifying specific values in various fields of a protocol header, referred to as header filtering; as well as identifying character strings within a payload portion of the packet, referred to as string filtering.

There are hundreds of known strings associated with hacker attacks, and the number is rapidly increasing. Much of the processing power in an IDS is devoted to searching all incoming payloads for matches of such known strings. Current IDS products are typically software-based, and may provide acceptable packet filtering performance on networks up to 100 Mbits/sec. However, processors within an IDS often become overwhelmed when network-data traffic rates exceed 30 Mbits/sec, and hence a 100 Mbit/sec Ethernet network may exceed the ability of an IDS to protect it.

Current IDSs are unable to protect high speed LANs running at 1000 Mbits/sec. They are also unable to protect networks at Internet access points, where speeds of 155 Mbits/sec and 622 Mbits/sec are common. Some companies are providing hardware support to improve IDS performance at higher speeds. However, the packet-filtering methods employed are conventional, and limited in their extensibility to high-speed networks.

A number of known string search methods exist, including those based upon the Rabin-Karp, the Knuth-Morris-Pratt, and the Boyer-Moore algorithms. These methods are designed to search for a single string, and must be executed once for each string in the filter set. It is common for IDS filters to contain hundreds of strings, and processors can quickly become overwhelmed.

SUMMARY OF THE INVENTION

An embodiment of the invention comprises a computer-based method for scanning data. The method comprises compressing a data string using a hashing algorithm to obtain a data-string signature and then determining if the data string signature matches a signature in a pre-determined lookup table of known data string signatures. The method further comprises identifying the data string as a known data string if the signature is determined to have a match in the lookup table.

Another embodiment of the present invention provides a method capable of searching for any number of strings in a single execution. This results in processing speeds of 10 to 100 times faster than current algorithms when used in applications such as IDS where there are hundreds of strings. This improved performance makes possible IDS products capable of protecting today's high speed networks.

In yet another embodiment of the invention, a sliding block of data is compressed using hashing techniques to create a string signature. The signature is used as an index into a lookup table to determine if the signature is consistent with any of the filter strings. A negative indication means that the data block does not contain any of the filter strings. A positive indication means that there is a probability of a match and further analysis may be needed to determine if a match exists.

DETAILED DESCRIPTION OF THE INVENTION

The following discussion is presented to enable a person skilled in the art to make and use the invention. The general principles described herein may be applied to embodiments and applications other than those detailed below without departing from the spirit and scope of the present invention. The present invention is not intended to be limited to the embodiments shown, but is to be accorded the widest scope consistent with the principles and features disclosed or suggested herein.

Embodiments of the present invention may be applied in the context of string filtering for the purpose of network-intrusion detection. But the following description is not intended to limit the use of the invention in other applications that use string filtering, such as word processors, signal processors, and/or database management tools.

Figure 1:
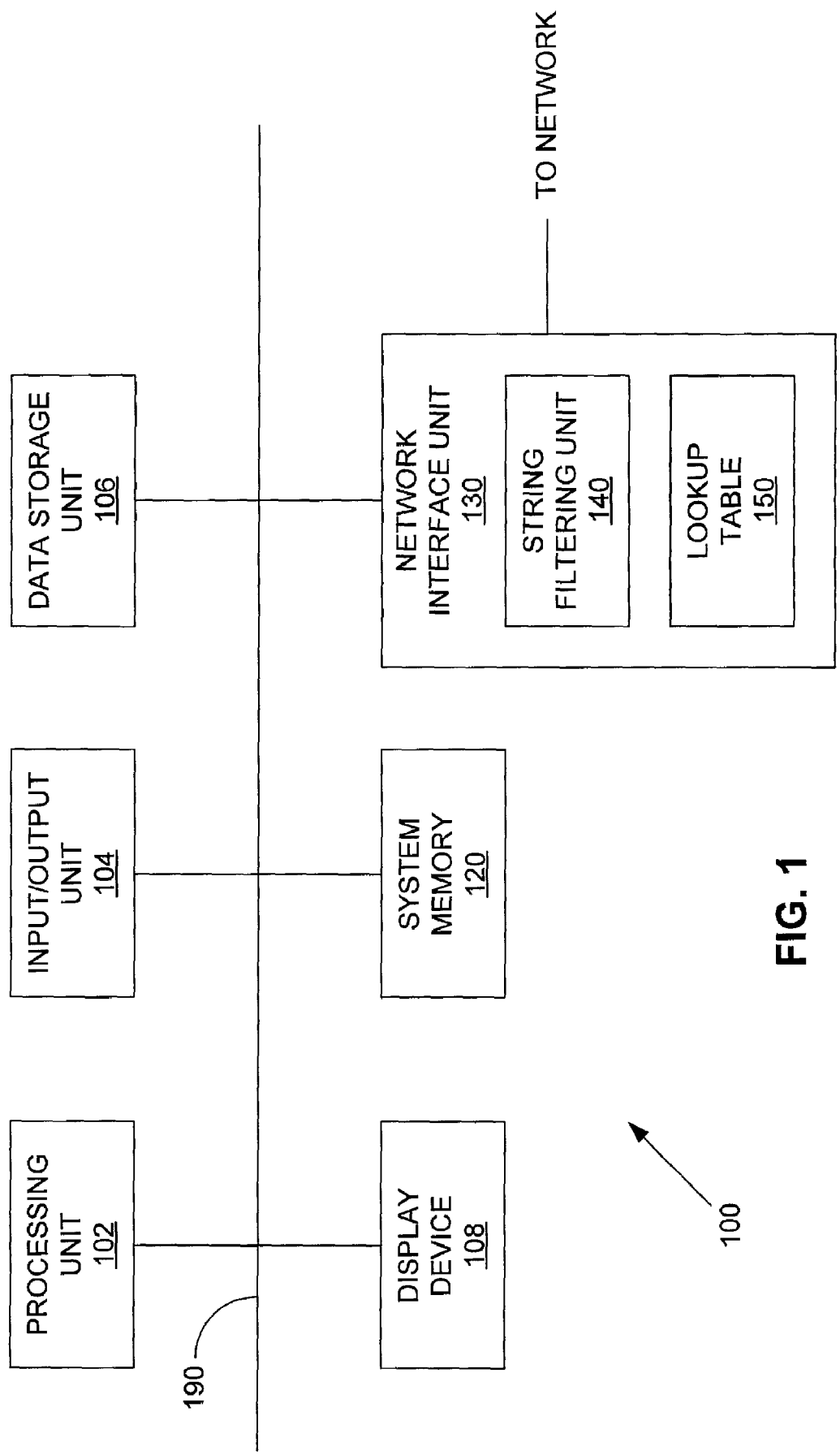
FIG. 1 is a block diagram of a system for string filtering constructed in accordance with an embodiment of the invention.

FIG. 1 is a block diagram of a system 100 for string filtering constructed in accordance with an embodiment of the invention. The system 100 may comprise a processing unit 102, an input/output unit 104, a data storage unit 106, a display device 108, a system memory 120, and a network-interface unit 130, each of which may be coupled to a common bus 190.

The network-interface unit 130 may interface the system 100 to a computer network upon which packet-filtering operations are required. The network-interface unit 130 may comprise conventional network communication or interface elements, as well as a string-filtering unit 140 and an associated lookup table 150 constructed and/or operating in accordance with an embodiment of the invention. The lookup table may reside in a local memory (not shown) on the network-interface unit 130 or in the system memory 120.

The string-filtering unit 140, in conjunction with the lookup table 150, may perform two string-filtering operations. The first string-filtering operation performs string filtering of the packet payload in data received which is described in detail below. The second, string-filtering operation performs packet-header filtering of the protocol header for all data received. Header filtering is well known to those in the art and will not be described further herein.

Figure 2:
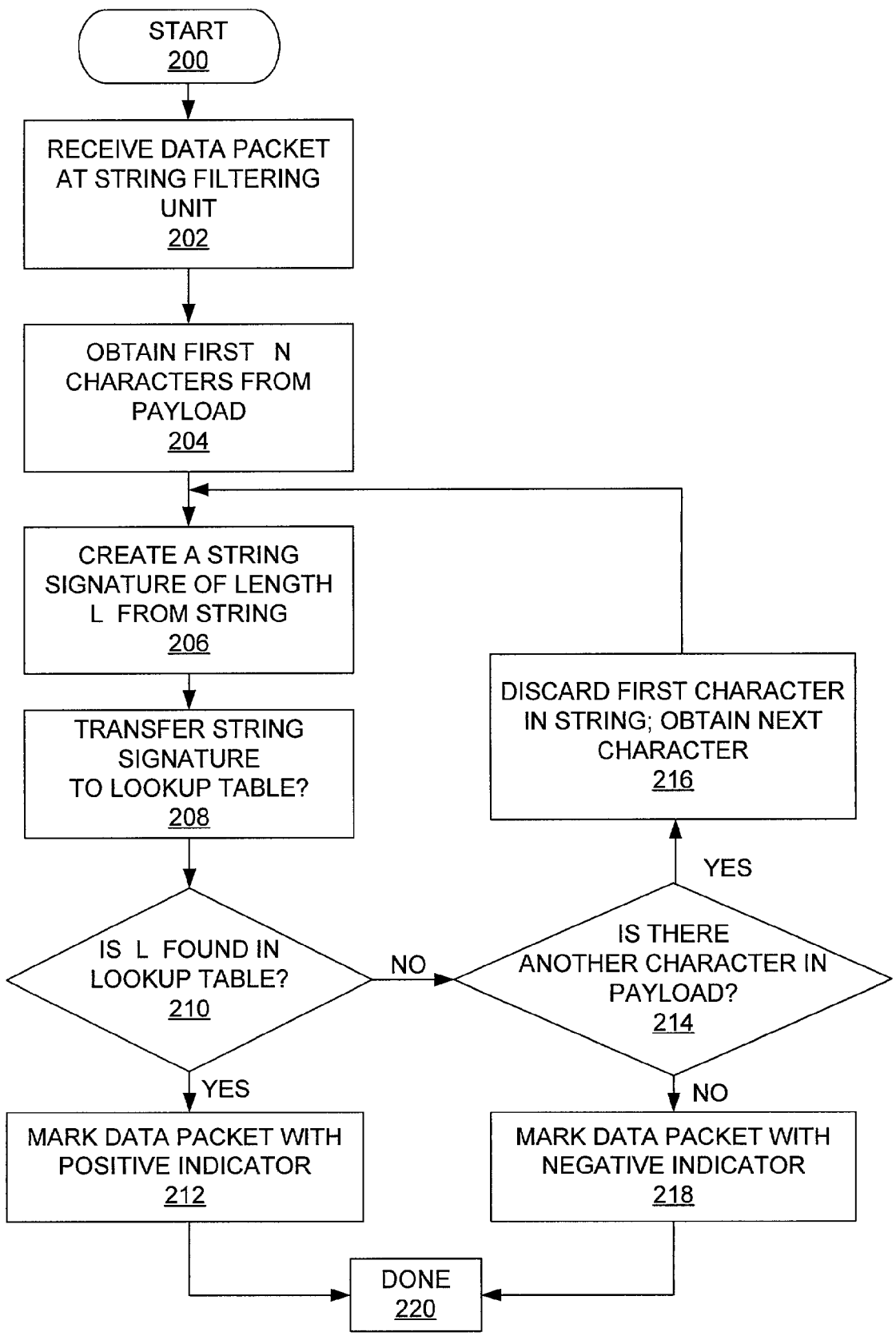
FIG. 2 is a flow chart of a method for string filtering in accordance with an embodiment of the invention.

FIG. 2 is a flow chart of an embodiment of a method for string filtering. The string-filtering unit 140 may comprise a state machine for carrying out the steps of the method illustrated in FIG. 2. In an exemplary embodiment, the string-filtering unit 140 may be implemented using a Field Programmable Gate Array (FPGA).

When data is to be filtered for known strings, i.e. strings of data that have a high probability of being malicious, each data packet is received by the network-interface unit 130 prior to passing the data packets on to the common bus 190 of the system 100. Only data packets which are marked with a negative indication may be discarded from the string-filtering process. Once a data packet has been marked with a positive indication, i.e. a high probability exists that a known malicious string is within the data packet, the entire data packet is sent over the common bus 190 to the processing unit 102 for further analysis. The further analysis of the data packet will not be discussed herein as different levels of filtering are known in the art.

When data packets are received from the network, the method illustrated in FIG. 2 begins at a START step 200. One data packet at a time is then received at the string-filtering unit 140 at step 202. The string-filtering unit 130 obtains the first n characters in the payload, where n is equal to a typical string length of the strings being sought. A typical string length is eight characters, but may be more or less depending on the sensitivity of the parameters of the filtering.

Next, each character in the string of length n is compressed using a hashing function to obtain a string signature of length l at step 206. The string signature of bit length l is sufficiently small to be used as an address to a lookup table. The hashing compression may be done at the byte level, such that each 8-bit character results in a 3-bit hash code by performing the following exclusive-or bit operations:

$h[0]=d[0].XOR.d[3]$  a.

$h[1]=d[1].XOR.d[4]$  b.

$h[2]=d[2].XOR.d[6]$  c.

The notations d[x] and h[x] denote bit 'x' of the data and hash codes, respectively, where zero is the least significant bit and seven is the most significant bit. Thus, each 8-bit character is compressed into a three-bit code, which now comprises three bits in the string signature of length l.

Once each character in the string of length n has been compressed to obtain a complete string signature, the string signature is sent to the lookup table 150 for comparison at step 208. The contents of the lookup table may indicate whether the data-string signature matches that of a filter-string signature, and what action may be taken as the result of a match. Filter strings or lengths less than n characters may be represented in the lookup table as multiple entries, where each entry represents the filter string and one of the possible combinations of "don't care" characters added to achieve a total length of n.

At step 210, a decision is made as to whether the string signature is found in the lookup table 150. If the string signature is found, then the method moves to step 212, where the data packet is marked with a positive indication. A positive indication will result in the termination of the process at step 220 as the data packet is sent to another filtering operation for further analysis. If, however, the string signature is not found in the lookup table 150, then the process moves to another decision block.

At step 214, a decision is made as to whether there is another character in the payload of the data packet following the first n characters. If there is an additional character, then it is added to the end of the string of length n while the first character is discarded at step 216. In this fashion, a sliding block of data of character length n may be compressed in a manner identical or analogous to that for the filter strings to generate a data-string signature. Thus, the new string of length n is now compressed at step 206 and the process repeats looking for known string signatures.

If, however, at step 214, it is determined that no additional characters exist in the payload of the data packet, then the data packet is marked with a negative indication at step 218. The data packet is then discarded from the filtering process and the method ends at step 220.

The following example illustrates how an embodiment of the present invention may be used to search for strings of up to eight characters (n=8) using 24-bit string signatures (l=24). The method illustrated herein shows a particular hashing algorithm that may be used by the string-filtering unit 140, however, many hashing algorithms are capable of being used in the process. Every possible hashing algorithm will not be described, however, it will be appreciated that the hashing algorithm may comprise the compression of any string length into any signature length using any logical rules without departing from the spirit and scope of the invention. Each character may be defined as an 8-bit byte having either an ASCII or binary value. An 8-character string spans 64 bits that must be compressed into a 24-bit string signature. Using this hashing function described above, the string signature for the filter string "disaster" may be computed as follows:

| i. | character | ASCII value d[7-0] | hash code h[2-0] |
|---|---|---|---|
| | 1. d | 01100100 | 000 |
| | 2. i | 01101001 | 100 |
| | 3. s | 01110011 | 101 |
| | 4. a | 01100001 | 101 |
| | 5. s | 01110011 | 101 |
| | 6. t | 01110100 | 010 |
| | 7. e | 01100101 | 001 |
| | 8. r | 01110010 | 100 |
| ii. | string signature "disaster" = | 000 100 101 101 101 010 001 100 | | i. = 04555214 in octal notation

The example provides a 24-bit string signature, which requires a lookup table having $2^{024}$, or 16,777,216 entries.

Octal location 04555214 corresponds to the filter string "disaster," and may be programmed with a code or reference that defines or corresponds to an action to be taken in the event that a data string signature matches the filter string signature for "disaster." Other filter strings may be programmed into the lookup table in an analogous manner. There may be multiple character strings that result in identical values, so a typical action may be to perform a more detailed check or examination upon the data to verify a precise match. Consequently, the described technique facilitates rapid pre-filtering of data to quickly eliminate data that does not contain or correspond to any of the filter strings.

In another example, the 7-character filter string "traitor" corresponds to an octal signature 2454224X where 'X' represents a "don't care" byte that may be added to achieve the 8-character length of the string search. This byte may have any of the eight possible hash values and still represent a valid string signature for "traitor". Each of the following octal locations in the lookup table may represent a string signature match, and may be correspondingly programmed with an action code or reference associated with "traitor":
 i. 24542240
 ii. 24542241
 iii. 24542242
 iv. 24542243
 v. 24542244
 vi. 24542245
 vii. 24542246
 viii. 24542247

The hashing algorithm in the above example may ignore two data bits in each character: d[5] and d[7]. This approach may be particularly well-suited for ASCII data, where bit d[5] primarily distinguishes capital letters from lower case letters. This is often useful when looking for strings where capitalization is ignored. In the above example, the strings "traitor", "Traitor" "TRAITOR", and "TrAiToR" may each provide the same result. Bit d[7] isn't used at all in ASCII and can be ignored with no effect. Although the hashing algorithm in the above example is biased toward ASCII data, there may be no degradation when processing binary data for applications in which the binary values are or appear to be random. Those skilled in the art will recognize that other hashing algorithms, any of which may ignore fewer or additional bits, may be utilized.

I claim:

1. A computer-based method for scanning data for one or more known data strings, the method comprising:
 (a) compressing a data string comprised of a plurality of characters to obtain a data string signature wherein compressing the data string comprises compressing each character in a manner independent of other characters in the data string and concatenating the compressed representations of each character;
 (b) determining if the data-string signature matches a stored string signature; and
 (c) if the signature is determined to have a match, then marking the data string with an indicator identifying the data string as a known data string.

2. The method of claim 1 wherein the data string is an eight-character data string, each character comprising eight bits.

3. The method of claim 1 wherein the data-string signature is a series of hash codes, each hash code comprising a three-bit representation of each character.

4. The method of claim 1 further comprising storing known data strings in a lookup table.

5. The method of claim 1 wherein the data is compressed using a hashing algorithm, the hashing algorithm comprising:
 (a) receiving a character of the data string, the character comprising a plurality of bits, each bit having a logical value of one or zero; and
 (b) setting the logical value of a first bit of a hash code to logical one only if a first pair of bits in the data string have different logical values.

6. The method of claim 5 wherein the hashing algorithm further comprises setting the logical value of a second bit of the hash code to logical one only if a second pair of bits in the data string have different logical values.

7. The method of claim 6 wherein the hashing algorithm further comprises setting the logical value of a third bit of the hash code to one only if a third pair of bits in the data string have different logical values.

8. The method of claim 1 wherein the data is compressed using a hashing algorithm, the hashing algorithm comprising:
 (a) receiving a character of the data string, the character comprising a plurality of bits, each bit having a logical value of one or zero; and
 (b) setting the logical value of a first bit of a hash code to logical zero only if a first pair of bits in the data string have different logical values.

9. The method of claim 8 wherein the hashing algorithm further comprises setting the logical value of a second bit of the hash code to logical zero only if a second pair of bits in the data string have different logical values.

10. The method of claim 9 wherein the hashing algorithm further comprises setting the logical value of a third bit of the hash code to logical zero only if a third pair of bits in the data string have different logical values.

11. The method of claim 1 further comprising sending data strings identified as known data-strings to be filtered.

12. The method of claim 1 further comprising providing the data string marked as a known data string to a filtering operation.

13. The method of claim 12 further comprising, if the data string is determined not to contain a known data string and if the data string includes a final character of data, then marking the data string with an indicator identifying the data string to be discarded from further filtering.

14. A computer-based method for scanning data for known strings of data, the method comprising:
 (a) receiving a stream of data strings, each data string comprising a plurality of eight-bit characters;
 (b) determining a three-bit hash code for each of the plurality of characters in the data string with the determination of the hash code for each character being independent of other characters in the data string;
 (c) concatenating each determined three-bit hash code to create a string signature;
 (d) determining that a data string contains a known data string if the string signature matches a string signature in a predetermined list of string signatures; and
 (e) if the data string is determined to contain a known data string, then marking the data string with an indicator identifying the data string as a known data string.

15. The method of claim 14 further comprising sending known data strings identified by comparison to the list of data string signatures for filtering.

16. The method of claim 14 wherein the determining the three-bit hash code comprises:
 (a) receiving a character of the data string, each character bit having a logical value of one or zero;

(b) setting the logical value of a first bit of a hash code to one only if the first received bit and the fourth received bit in the data string have different logical values;

(c) setting the logical value of a second bit of the hash code to one only if the second received bit and the fifth received bit in the data string have different logical values;

(d) setting the logical value of a third bit of the hash code to one only if the third received bit and the seventh received bit in the data string have different logical values; and (e) repeating steps (a) through (c) for all characters in the data string.

17. The method of claim 14 further comprising providing the data string marked as a known data string to a filtering operation.

18. The method of claim 17 further comprising, if the data string is determined not to contain a known data string and if the data string includes a final character from the stream, then marking the data string with an indicator identifying the data string to be discarded from further filtering.

19. A computer-based method of scanning data for known strings of data, the method comprising:

(a) receiving a stream of data strings at a filter, the stream of data comprising a plurality of characters;

(b) determining a first hash code for the first character in the stream of data, (c) determining a second hash code for the second character in the stream of data in a manner independent of the first character;

(d) concatenating the first hash code with the second hash code;

(e) comparing the concatenated hash codes to a list of known concatenated hash codes; and (f) if the concatenated hash codes match known concatenated hash codes, then marking the data string with an indicator identifying the data string as a known string of data.

20. The method of claim 19 wherein each character comprises a plurality of bits set to a logical one or a logical zero.

21. The method of claim 20 wherein determining a hash code comprises:

(a) receiving a character of the data string, each character bit having a logical value of one or zero; and (b) setting the logical value of a first bit of a hash code to logical one only if a first pair of bits in the data string have different logical values.

22. The method of claim 21 wherein determining a hash code comprises:

(a) receiving a character of the data string, each character bit having a logical value of one or zero; and (b) setting the logical value of a second bit of a hash code to logical one only if a second pair of bits in the data string have the same logical values.

23. The method of claim 22 wherein determining a hash code comprises:

(a) receiving a character of the data string, each character bit having a logical value of one or zero; and (b) setting the logical value of a third bit of a hash code to logical one only if a third pair of bits in the data string have the same logical values.

24. The method of claim 19 further comprising (a) determining a third hash code for the third character in the stream of data;

(b) concatenating the second hash code with the third hash code; and (c) comparing the concatenated hash codes to a list of known concatenated hash codes.

25. The method of claim 19 further comprising providing the data string marked as a known data string to a filtering operation.

26. The method of claim 25 further comprising, if the data string is determined not to contain a known data string and if the data string includes a final character from the stream, then marking the data string with an indicator identifying the data string to be discarded from further filtering.

27. A system for scanning data for known strings of data, the system comprising:

(a) a lookup table in a memory operable to store known data-string signatures; and (b) a string-filtering unit connected to a network and coupled to the memory, the string filtering unit operable to: (i) compress a data string comprised of a plurality of characters to obtain a data string signature; (ii) determine if the data string signature matches a known data-string signatures in the lookup table; and (iii) if the data string signature is determined to match a known data-string signature, then marking the data string with an indicator identifying the data string as a known string of data, wherein the string-filtering unit is operable to compress the data string by compressing each character in a manner independent of other characters in the data string and concatenating the compressed representations of each character.

28. The system of claim 27 wherein the data string is compressed with a hashing algorithm, the hashing algorithm comprising:

(a) receiving a data string as an eight bit string of data, each bit having a logical value of one or zero;

(b) setting the logical value of a first bit of a hash code to logical one only if a first pair of bits in the data string have different logical values.

29. The system of claim 28 wherein the hashing algorithm further comprises setting the logical value of a second bit of the hash code to logical one only if a second pair of bits in the data string have different logical values.

30. The system of claim 29 wherein the hashing algorithm further comprises setting the logical value of a third bit of the hash code to logical one only if a third pair of bits in the data string have different logical values.

31. The system of claim 27 wherein the string-filtering unit is further operable to provide the data string marked as a known data string to a filtering operation.

32. The system of claim 31 wherein the string-filtering unit is further operable, if the data string is determined not to contain a known data string and if the data string includes a final character of data, to then mark the data string with an indicator identifying the data string to be discarded from further filtering.

* * * * *